Figure 1:
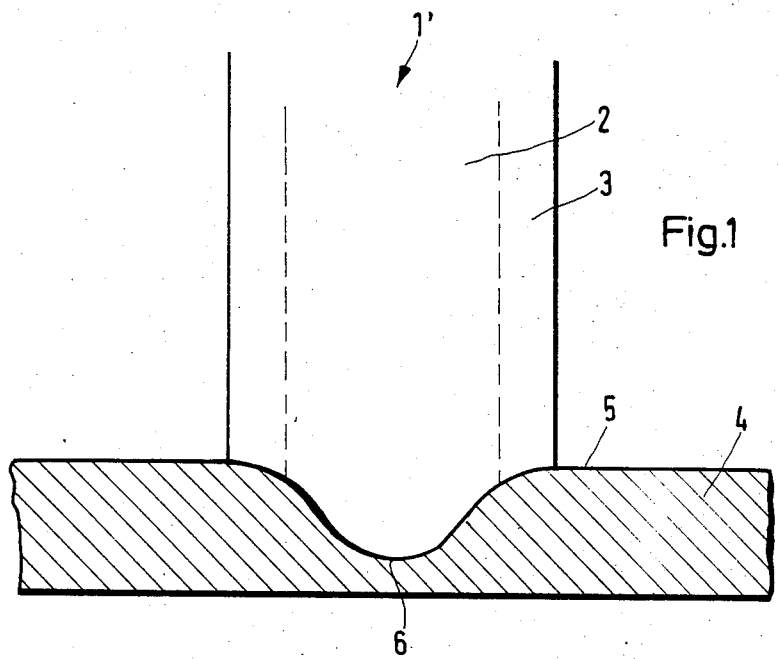

United States Patent [19]

Steinhoff

[11] Patent Number: 4,606,747

[45] Date of Patent: Aug. 19, 1986

[54] PROCESS FOR THE CONTACT-LESS REMOVAL OF MATERIAL FROM THE SURFACE OF A GLASS OBJECT

[75] Inventor: Hans-Joachim Steinhoff, Zwiesel, Fed. Rep. of Germany

[73] Assignee: Schott-Zwiesel-Glaswerke AG, Zwiesel, Fed. Rep. of Germany

[21] Appl. No.: 727,195

[22] Filed: Apr. 29, 1985

Related U.S. Application Data

[63] Continuation of Ser. No. 437,174, Oct. 28, 1982, abandoned.

[30] Foreign Application Priority Data

Nov. 14, 1981 [DE] Fed. Rep. of Germany ....... 3145278

[51] Int. Cl.$^4$ .................... C03C 23/00; C03B 19/00; B23K 9/00
[52] U.S. Cl. ......................................... 65/31; 65/102; 65/105; 65/112; 219/121 LJ; 219/121 LP; 219/121 LT
[58] Field of Search ................ 65/61, 105, 106, 102, 65/112, 31; 219/121 LT, 121 LP, 121 LH, 121 LJ; 204/5

[56] References Cited

U.S. PATENT DOCUMENTS

| | | | |
|---|---|---|---|
| 3,419,321 | 12/1968 | Barber et al. ..................... | 65/112 X |
| 3,670,260 | 6/1972 | Koester et al. ..................... | 331/94.5 |
| 3,724,924 | 4/1973 | Lenfant et al. ........... | 219/121 LT X |
| 3,740,524 | 6/1973 | Dahlberg et al. .............. | 219/121 LJ |
| 4,063,063 | 12/1977 | Funk et al. ........................... | 134/1 X |
| 4,128,752 | 12/1978 | Gravel ............................. | 219/121 L |
| 4,146,380 | 3/1979 | Caffarella et al. ..................... | 65/105 |
| 4,172,219 | 10/1979 | Deml et al. ................ | 219/121 LJ X |
| 4,188,240 | 2/1980 | Yoshio ................................. | 204/5 X |
| 4,219,721 | 8/1980 | Kamen et al. ............... | 219/121 LM |
| 4,238,141 | 12/1980 | Greiner ......................... | 350/162.15 |
| 4,336,439 | 6/1982 | Sashett et al. ............... | 219/121 LH |
| 4,336,978 | 6/1982 | Suzuki ............................. | 350/320 X |
| 4,368,080 | 1/1983 | Langen et al. .......................... | 134/1 |
| 4,475,027 | 10/1984 | Pressley ..................... | 219/121 LP X |

OTHER PUBLICATIONS

Grimm, M. A., IBM Technical Disclosure Bull. vol. 14, No. 9, 2/1972; "Optical System for Laser Machining of Narrow Slots"; pp. 1 and 2.

*Primary Examiner*—Kenneth M. Schor
*Attorney, Agent, or Firm*—Donald C. Studley; Michael L. Dunn

[57] ABSTRACT

Described is a process for the contact-less removal of material from the surface of an article of brittle material, in particular glass, by means of a laser beam. So that material can be removed, with sharp edges, without splintering, and also in order to permit non-sharp surfaces, the invention provides that the laser beam (1) is passed through at least one at least partially absorbent matrix (7) and split into a plurality of individual beams (1'). By that means, the energy available in the laser beam is split up, in the beam cross-section, and the individual beams can be adapted to a desired removal effect. The apparatus for carrying out the process is characterized in that the matrix (7) has straight and/or curved fields (8, 9) with preferably a high absorption capability in respect of laser beams.

9 Claims, 5 Drawing Figures

PROCESS FOR THE CONTACT-LESS REMOVAL OF MATERIAL FROM THE SURFACE OF A GLASS OBJECT

This is a continuation of application Ser. No. 437,174, filed Oct. 28, 1982, now abandoned.

The invention relates to a process for the contact-less removal of material from the surface of an object comprising brittle material, in particular glass, by means of a laser beam, and apparatus for carrying out the process.

The use of laser beams is already known for the purposes of decorating and marking glass articles. In that process, the glass articles are intended to undergo chemical or physical reaction under the effect of the laser radiation used, and experience permanent changes. In order to provide a satisfactory decoration effect, clamping and centering means and optical systems are provided to guide the laser beam in the desired manner.

A disadvantage in that connection is that macroscopic splinter damage occurs on the glass articles in the edge region of the laser beam. Such splinterings at least resulted in an unpleasant external appearance, were unpleasant to touch and could possibly also result in injury and in some cases could even result in damage and breakage due to further glass splintering off.

For the above-indicated reasons, lasers have only been used to a very limited extent for the purposes of marking glass articles, and other methods have been tried. In order to apply marks, calibration lines, company identification, characters, decorative lines, patterns or pictorial representations to articles of glass, processes have already been previously developed, which involve applying material and which involve removing material.

The application processes include the application of paint with a brush, screen printing wherein a screen printing stencil is rolled against the workpiece and ink or dye is urged through the screen by a doctor device, and the application of transfers. Such a process is followed by a baking operation in a furnace in order to render the marking permanent. For that purpose, it is also necessary to use special paints, which have a coefficient of expansion that is adapted to the base material, which can be wiped clean, which are resistant to use in a dishwashing machine, and which have a high degree of chemical resistance.

In the material-removal operations, layers of material are removed from the surface of the object to be operated on, etching using hydrofluoric acid or fluoride-bearing pastes being known. Material-removal processes are also performed by means of a sand blasting device. Grinding by means of grinding discs and copper wheels is also known in the decoration art.

The above-mentioned known processes are expensive in respect of time and energy consumed, are not contact-free, and possibly require special production lines in mass-production manufacture.

The problem of the present invention is therefore to provide a process for the contact-less removal of material with a laser beam, and an apparatus for carrying out such a process, which makes it possible to remove material in such a way as to produce a sharp edge, without splintering, and also non-sharp surfaces.

In regard to the process, in accordance with the invention, that problem is solved in that the laser beam is passed through at least one at least partially absorbent matrix and split into a plurality of individual beams. In that way, the energy available in the laser beam can be split symmetrically or asymmetrically in the beam cross section and the individual beams can be adapted to give a desired removal effect; in that respect, that includes an optical effect on the individual beam of the laser light, primarily a change in intensity, but possibly also a change in the direction of the beam, taking account of diffraction. The matrix virtually provides a beam splitter which, depending on its configuration, permits damping or attenuation of the energy in the laser beam and/or diffraction at desired locations within the beam splitter matrix.

The novel process advantageously operates without contact between the workpiece and the tool, that is to say, neither fluids nor mass-laden particle beams are physically applied to the surface to be operated on. Use of the process according to the invention enjoys the advantages of influencing light, without an undesirably high level of light intensity occurring at certain points, for example in the edge region of the beam, and without the resulting damage to the surface of the material to be operated on.

A mask is advantageously arranged between the laser light source, that is to say, the laser, and the workpiece, the mask determining the form of the marking on the surface of the material. In particular cases, the mask and the matrix may also be combined together in only one component so that the mask includes the matrix, for example a screen which is perforated within a given outside contour. The optical system used between the laser and the workpiece permits the size and configuration of permanent characters, marking or decoration which is to be applied for example to the surface, to be altered, but it also permits the object to be operated on to be cut through, if more specifically a sufficiently large amount of material is removed. It is also advantageous for a gas jet to be directed onto the operating location during the material-removal process, for carrying away the particles which have been removed. Further functions of the gas jet are chemically and thermally influencing the location of operation; for example, accelerating surface reactions by a pre-heating effect; possibly also cooling; in addition, the supply of additive dusts, for example metal oxides, for colouring the area of operation. The gases used for that purpose are for example inert gases, noble gases, oxygen and combustible gases, such as hydrogen, propane, air and mixtures thereof.

In accordance with the invention, it is desirable for the matrix and/or the surface of the object to be operated on to be moved with a translatory and/or rotary movement, continuously and/or discontinuously, in the laser beam. The splintering phenomenon is avoided in particular by such a movement. In addition, the above-described movement produces controlled distribution of the laser beam, and thus a change in the distribution of energy, in particular in regard to homogenisation or attenuation thereof. It is realised that the nature and type of the matrix in the beam cross-section determines the intensity, the degree and the disposition of the removal of material, on the workpiece. Therefore, it is advantageously possible to produce given, desired macro patterns, without areas of poor definition occurring in the marginal region of the marking, as is inevitable for example when using the sand blasting method.

In accordance with the invention, it is advantageous for the laser beam to be directed in a pulsating mode onto the surface of the object to be operated on. Although continuous-operation lasers can be used for marking or severing brittle materials, particularly in the case of glass, such as for example hollow glass and flat glass, in a cold condition, use of a pulsed laser in conjunction with the features of the present invention is particularly desirable, including for producing shading effects. The stepped or graded action of the individual laser beam on the material, and the desired depth of penetration of the individual beam in the material, can then also be varied in a finely stepped manner.

In regard to the apparatus for carrying out the above-described process, the problem is solved in accordance with the invention in that the matrix has straight and/or curved fields or areas with a preferably high laser beam absorption capability. At least one matrix for locally influencing the intensity of the laser beam is used for carrying out the process according to the invention, although a plurality of matrices can also be arranged at the desired location in the beam path between the laser and the workpiece. The matrix may be arranged for example, in the above-described optical beam path, upstream or downstream or, in another embodiment, upstream and downstream of the mask. The essence of the matrix according to the invention is that it acts on the one hand as a beam splitter and on the other hand deflects or attenuates the intensity of the light beam, possibly in a locally differentiated manner. That is effected by means of fields which have the same or different levels of absorption capability, and such fields or areas may be of different configurations and arrangements. A preferred embodiment of the invention is for example characterised in that the absorbent fields or areas of the matrix are bar-like lines, and are preferably arranged to form a grid or screen. Although the absorbent areas or fields may also be curved lines, round or cornered, flat areas or fields, the manner of construction as a grid or screen matrix however is particularly simple and highly effective from the optical point of view. The bars of the grid or screen have a high level of absorption capability and, if they are metal screens of the like, the bar portions are impervious to the incident light. Apart from splitting up the overall laser beam which impinges onto the matrix, into a plurality of divided individual beams, diffraction can also play an advantageous part, taking into account the wave nature of light, particularly in the marginal regions of the matrix or the laser beam.

However, it is also possible to envisage other advantageous embodiments which, in accordance with the invention, are characterised in that the matrix is a surface with a high level of absorption capability, the surface being provided with holes, or comprises optically active materials. The matrix may comprise partly solid and partly non-transmissive and/or optically active material, such as one or more lenses. The optically active material may also be for example a crystal having a given degree of absorption, which can be of varying thickness over the laser beam cross-section, so that it has different optical actions. Grids, screens, perforated plates, perforated discs or the like are characterised by regions which transmit the incident laser light and regions which do not transmit it. The fields of a matrix of such a configuration comprise the mechanically strong metal which does not transmit light, wherein the sharp structure of such constructions can be loosened up or softened in its effect, by the above-mentioned translatory and/or rotary motion, preferably the motion of the matrix itself.

The movements may take place in any direction and form. For example, it is possible to visualise a right-angled coordinate system placed in the preferably flat surface of the matrix, with the translatory movement thereof then taking place in at least one of the three directions in space (three translatory degrees of freedom). It is also possible to visualise rotary movements around those three directions in space, as an axis of rotation (three rotary degrees of freedom), and the mechanical arrangement for producing such movements can be designed by the man skilled in the art. In this connection, combinations of translatory and rotary movements in any direction are also possible. It is also desirable for such movements to be produced as oscillating movements or movements in oscillatory form, with a wide range of wave configurations. In this connection, it has already been mentioned that either the workpiece or the matrix or both are moved relative to the laser beam. Because of that, and when using pulsed laser light, the laser pulses strike the workpiece one beside the other and at different levels of intensity so as to permit a differentiated, shadow-like surface image, by the removal of material of the article.

If a suitable movement is produced, between the laser beam and the workpiece, it is possible for the material to be removed from the respective surfaces of the workpiece in layers, in such a way that the laser beam can also be used for dividing, that is to say, severing, or cutting out areas of brittle materials.

The term brittle material is used preferably to denote glass, although ceramic and brittle plastics materials, for example acrylic glass can also be operated on, by means of the steps in accordance with the invention. In this connection, an important consideration is in particular that, in one embodiment, the material which is to be processed has an absorption edge in the laser light wavelength range, that is to say, it absorbs the laser light which impinges on its surface, to such a degree that the material is for example vaporised and removed in that manner. In another embodiment however, the surface of a workpiece which is pervious to the laser beam can be processed in the above-specified manner, by applying an absorbing surface layer, for example lacquers, paints, or films or foils.

If the matrix has absorbent surfaces comprising solid material, for example a perforated plate or a screen, care must also be taken to ensure that the matrix itself does not suffer damage or become inoperative in the course of the operating procedure because for example the laser beam energy is converted on the surface of the matrix, and results in the vaporisation of material. It has been found however that it is possible without danger to use the usual materials employed in optics, in particular metals, when using for example a $CO_2$ laser with a wavelength of 10.2 $\mu$m. In that wavelength range, in particular glass, insofar as it is not special glass, is not transmissive so that when such a laser is used, the energy is converted in the surface of the glass, and material can be removed in that manner.

The process and the apparatus according to the invention therefore permit material to be removed from the surface of the workpiece in a defined and substantially controllable and modulatable manner. It is also possible for example to produce desired rupture locations, as required, or completely to sever certain parts of material, in a desired configuration. In such operations, advantageously, preferably no measurable stresses which could result in damage to the workpiece occur at the points at which material is removed or the material is severed. The process in accordance with the invention, which operates in a contact-less manner, permits brittle materials, in particular articles of glass, to be rapidly marked and severed. The beam splitter matrix eliminates or reduces non-uniform distribution of intensity of the laser beam light in the laser beam cross-section. One or more intensity peaks in the laser beam can be unified by a higher degree of diffraction or limitation or masking, depending on the nature and setting of the beam splitter matrix.

Transitional regions can also be adjustably influenced, from the edge of the laser beam cross-section inwardly thereof or from the interior outwardly thereof, in such a way that the corresponding transitional regions of the materal can be acted upon by the laser beam light, in a stepped or graded manner.

The maximum depth of penetration of the laser beam into the top layer of material occurs in the centre of the individual beams.

The process according to the invention and the apparatus also permit the same location on the workpiece to be operated on, several times, if the beam splitter matrix is moved, between the individual points of action of the laser beam on the material, with any translatory or rotary movement in space, with any desired axis, or with a combined translatory/rotary movement, in such a way that a fresh depression or recess is formed beside an existing point at which material has been removed by the individual beams, with the purpose of unifying the structure of the surface which has been removed. That therefore produces a surface effect similarly to that of a sand blasting treatment, without the necessity to tolerate the disadvantages of the sand blasting method, for the invention provides that operation can be without contact, while producing sharp edges. The process of removing material by means of divided laser beams can be repeated as required and permits the production of a structure if the workpiece is additionally moved while the laser beam is acting on the material or between the moments at which the laser beam acts on the material. In this way, it is possible to produce structured shadow-like effects, in such a way that a location at which a smaller amount of material has been removed is positioned beside a point at which a large amount of material has been removed. The defined removal of material by this process can be continued until the glass or other kind or brittle material has been cut through. The cutting character will depend on the configuration of the selected beam splitter and the movement thereof.

Figure 2:
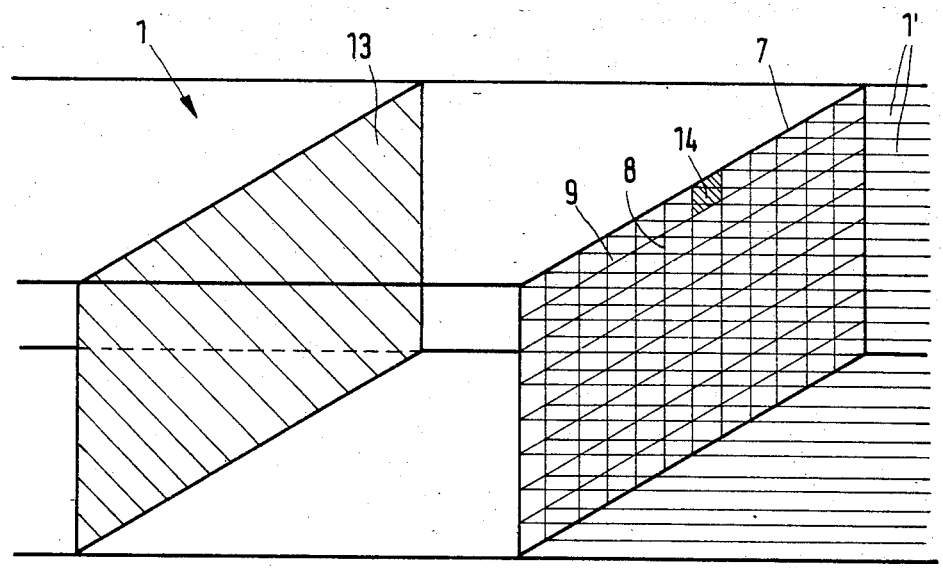
Figure 3:
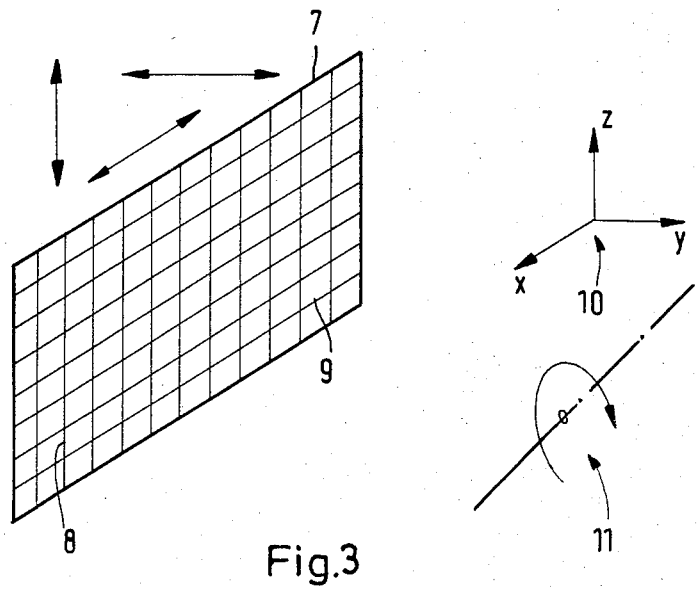
Figure 4:
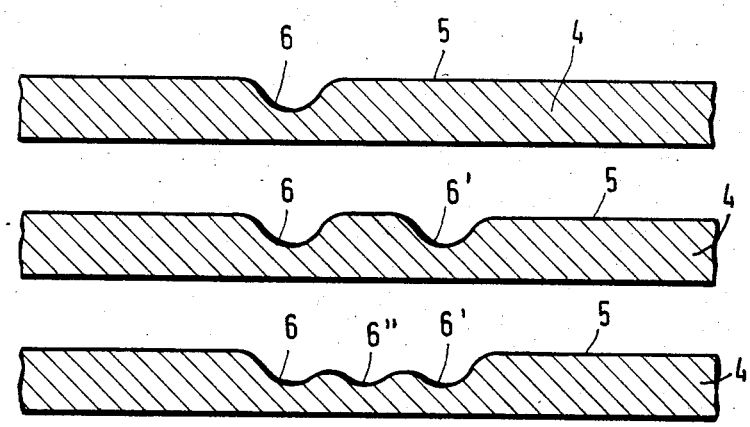
Figure 5:
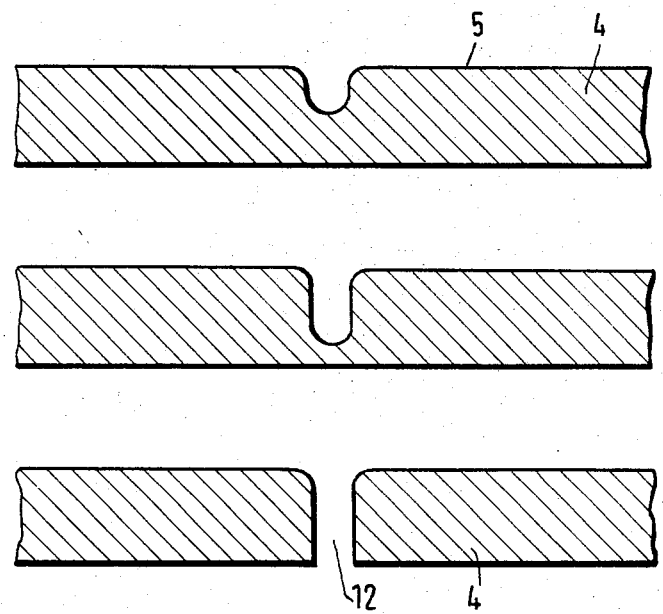

Further advantages, features and possible uses of the present invention will be apparent from the following description of preferred embodiments, in conjunction with the drawings in which:

FIG. 1 is a diagrammatic view of part of the result of the process according to the invention, showing the effect of an individual beam which has been split off, on a workpiece which is shown in broken away form, with cross-sectional hatching, FIG. 2 is a diagrammatic view showing the full laser beam on the left, and, on the right, the outgoing part of the laser light, which has been divided into a plurality of individual beams by the matrix, FIG. 3 shows a particular embodiment of the matrix in the form of a screen with the possibility of movement as indicated by the double arrows, in a coordinate system X, Y, Z, and any axis of rotation in respect of space, as a possible rotary movement, FIG. 4 shows views in cross-section of broken-away parts of a processed workpiece after various processing sequences, and FIG. 5 shows a view similar to that shown in FIG. 4, except that it illustrates the material being severed by successive surface treatments.

The possibility of acting on layers of material at the surface or also further into the interior of the material, without contact therewith, will already be appreciated from the reference to a divided or split laser beam which is diagrammatically indicated at 1' in cross-section in FIG. 1. FIG. 1 shows a single individual beam 1' having a central region 2 and the edge region 3 which is separated from the central region 2 by the broken lines. The brittle material is indicated by 4 and is intended to represent a piece of glass. In the region in which the individual beam 1' operates, the surface 5 of the material 4 has a trough-like depression or recess 6 which is at its maximum in the central region 2 and from there merges outwardly onto the surface 5, in cross-section, in a constant curve illustrated here.

The full laser beam 1 which is for example of square or rectangular cross-section as indicated at 13 in FIG. 2 extends towards the right, to the matrix 7 which is in the form of a metal screen with straight bar portions 8 and 9 which in this case each intersect at right angles. In the idealized view shown in FIG. 2, the surface of the beam splitter matrix fills out the entire beam cross-section of the laser light 1. In the region to the right of the matrix 7 (in front of the matrix, in the perspective illustration, from the point of view of the observer), the individual beams 1' issue with the illustrated cross-section indicated at 14, the individual beams 1' obviously extending in the same direction, towards the right, as the full laser beam 1, and parallel thereto. The plurality of lines 1' is intended to indicate that the laser beam 1 has been divided into a large plurality of individual beams 1'. As the laser light 1 cannot pass through the metal bar portions 8 and 9 of the matrix 7, the intensity of the beam is weakened by the line-like bar portions which are absorbent in the laser beam, and diffraction phenomena are also possible, although they are not pictorially represented here.

FIG. 3 more clearly illustrates the matrix 7 with the vertically extending, linear bar portions 8 and the linear bar portions 9 which extend horizontally, perpendicularly thereto. The straight double-headed arrows illustrate possible translatory movements (in three translatory degrees of freedom) of the screen matrix 7, corresponding to the right-angled coordinate system generally indicated at 10. The circular arrow 11 indicates the possibility of rotary movement about any axis in space. Limited periodic or periodically reversing rotary movement is also possible.

FIG. 4 shows, once again in broken-away cross-sectional view, an article 4 of glass which, in a downward direction in the drawing, shows three different stages in the process. After an individual beam 1' which is not shown in FIG. 4 has first acted on the material, the surface 5 of the glass material 4 has a trough-like recess 6, corresponding to the configuration shown in FIG. 1.

If the beam splitter matrix 7 is moved on with a translatory and/or rotary movement relative to the workpiece 4, and an individual beam 1' operates on the material in a similar manner at another location, or after two separate individual beams 1' have operated on the material at the same time, and after a corresponding amount of material has been removed from the surface 5, the result is the condition of the middle part in FIG. 4, with the two spaced-apart troughs 6 and 6'. The spacing between the two troughs could correspond to two openings in a matrix or between absorbent areas or fields of a matrix, because it is only through such openings that the respective individual beam 1' could reach the surface 5 of the glass material 4.

The condition shown at the bottom in FIG. 4 corresponds to a further processing step, more specifically when the surface 5 of the glass material 4 has been again exposed to an individual laser beam 1' at another position which is between the two troughs 6 and 6'. That then produces a surface profile with three juxtaposed troughs 6, 6" and 6'.

In another kind of operation, namely, cutting through a brittle material 4, the procedure is as illustrated in FIG. 5. The top condition shown in FIG. 5 is that produced after a full laser beam 1 has acted on the surface 5, after a first period of time; the middle condition is the result of operation after a further period of time; and, if the laser beam 1 or the plurality of individual beams 1' have acted on the glass article 4 for a sufficiently long period of time, then the article 4 is severed as shown in the lowermost view in FIG. 5, with a gap 12. In the region of the gap 12, the energy in the laser beam is converted by absorption in the glass article 4, in such a way that the material is removed and thus carried away, by vaporisation.

I claim:

1. A process for the removal of a portion from an article of glass, ceramic or plastic which comprises the steps of:
   (a) positioning at least one partially absorbent matrix between a laser beam source and the article,
   (b) positioning a mask between said laser beam source and said article,
   (c) passing a laser beam from said laser beam source (1) through said matrix to divide said beam into a plurality of smaller beams having varied intensities and (2) through said mask to provide a pattern of markings on the surface of said article
   (d) passing the resulting plurality of smaller beams into contact with the article to remove portions of said article, and
   (e) effecting relative movement between the matrix and the article while said beams are in contact with the article to provide a smooth finish on the article.
2. The method of claim 1 wherein said matrix is in the form of a grid.
3. The method of claim 1 wherein said mask is positioned to separate said matrix and said article.
4. The method of claim 1 wherein said mask is positioned to separate said laser beam source and said matrix.
5. The method of claim 2 wherein the article is of glass.
6. The method of claim 1 wherein said matrix is moved with a translatory or rotary movement relative to said article during passage of said laser beam.
7. The method of claim 1 wherein said article is moved with a translatory or rotary movement relative to said matrix during passage of said laser beam.
8. The method of claim 1 wherein said article and said matrix are moved with a translatory or rotary movement relative to each other during passage of said laser beam.
9. The method of claim 1 wherein the laser beam is operated in a pulsating mode.

* * * * *